(12) United States Patent
Ziv

(10) Patent No.: US 9,037,850 B2
(45) Date of Patent: May 19, 2015

(54) SESSION HANDOVER BETWEEN TERMINALS

(75) Inventor: Aran Ziv, Netanya (IL)

(73) Assignee: SANDISK IL LTD., Kfar Saba (IL)

(*) Notice: Subject to any disclaimer, the term of this patent is extended or adjusted under 35 U.S.C. 154(b) by 1005 days.

(21) Appl. No.: 11/687,651

(22) Filed: Mar. 18, 2007

(65) Prior Publication Data
US 2007/0234048 A1    Oct. 4, 2007

Related U.S. Application Data

(60) Provisional application No. 60/783,191, filed on Mar. 17, 2006.

(51) Int. Cl.
| | |
|---|---|
| *H04L 29/06* | (2006.01) |
| *H04M 3/56* | (2006.01) |
| *H04N 21/41* | (2011.01) |
| *H04N 21/4363* | (2011.01) |
| *H04N 21/4627* | (2011.01) |
| *H04W 4/16* | (2009.01) |

(Continued)

(52) U.S. Cl.
CPC .............. *H04L 63/18* (2013.01); *H04M 3/38* (2013.01); *H04M 3/56* (2013.01); *H04M 2203/1066* (2013.01); *H04M 2203/358* (2013.01); *H04M 2207/18* (2013.01); *H04M 2250/02* (2013.01); *H04N 21/4126* (2013.01); *H04N 21/43637* (2013.01); *H04N 21/4627* (2013.01); *H04W 4/16* (2013.01); *H04W 36/00* (2013.01); *H04W 80/10* (2013.01); *H04W 84/18* (2013.01); *H04W 92/18* (2013.01); *H04L 67/14* (2013.01); *H04L 67/142* (2013.01)

(58) Field of Classification Search
CPC .................................. H04L 63/18; H04M 3/56
USPC ........................................................... 713/159
See application file for complete search history.

(56) References Cited

U.S. PATENT DOCUMENTS 8,010,984 B2 * 8/2011 Thukral ......................... 725/86
2002/0071556 A1 * 6/2002 Moskowitz et al. .......... 380/210

(Continued)

OTHER PUBLICATIONS

Microsoft Corporation, "MCSE Training Kit: Microsoft Internet Security and Acceleration Server 2000", May 30, 2001, Microsoft Press, pp. 195-196.*

(Continued)

*Primary Examiner* — Yin-Chen Shaw
*Assistant Examiner* — Michael Guirguis
(74) *Attorney, Agent, or Firm* — Toler Law Group, PC

(57) ABSTRACT

Methods, apparatus, systems and devices for facilitating transfer of a remote session from a first user terminal to a second user terminal are disclosed herein. According to one example, the transferred remote session is a telephone call session. According to another example, the transferred remote session is a session of a rights-enabled remote on-demand service—for example, a service where on demand media content is remotely provided or an interactive game service. In some embodiments, data indicative of usage rights for the remote service is transferred from the first to the second user terminal. In some embodiments, in order to transfer the session between the first terminal and second terminal, the user terminals are brought in proximity or into contact, and data indicative of the session is sent via a short-range communications channel, for example a short-range contact or 'wired' channel, or a short-range wireless link, for example, a Bluetooth or infrared link.

27 Claims, 16 Drawing Sheets

(51) Int. Cl.
*H04L 29/08* (2006.01)
*H04M 3/38* (2006.01)
*H04W 36/00* (2009.01)
*H04W 80/10* (2009.01)
*H04W 84/18* (2009.01)
*H04W 92/18* (2009.01)

(56) References Cited

U.S. PATENT DOCUMENTS

| | | | |
|---|---|---|---|
| 2002/0107973 A1* | 8/2002 | Lennon et al. | 709/231 |
| 2003/0055977 A1 | 3/2003 | Miller | |
| 2003/0088676 A1* | 5/2003 | Smith et al. | 709/227 |
| 2003/0101343 A1* | 5/2003 | Eaton et al. | 713/170 |
| 2004/0023673 A1* | 2/2004 | Dafcik | 455/462 |
| 2004/0031058 A1* | 2/2004 | Reisman | 725/112 |
| 2004/0068567 A1 | 4/2004 | Moran et al. | |
| 2004/0210657 A1* | 10/2004 | Narayanan et al. | 709/227 |
| 2005/0163316 A1* | 7/2005 | Wing | 380/257 |
| 2005/0182931 A1* | 8/2005 | Robert et al. | 713/168 |
| 2006/0106727 A1* | 5/2006 | Yellai et al. | 705/59 |
| 2006/0114861 A1* | 6/2006 | Kikuchi et al. | 370/335 |
| 2006/0174313 A1* | 8/2006 | Ducheneaut et al. | 725/135 |
| 2007/0019616 A1* | 1/2007 | Rantapuska et al. | 370/352 |
| 2007/0056000 A1* | 3/2007 | Pantalone et al. | 725/90 |
| 2007/0094490 A1* | 4/2007 | Lohr | 713/153 |
| 2007/0291694 A1* | 12/2007 | Zhang | 370/331 |

OTHER PUBLICATIONS

Hua, Zhang, et al. "Content protection for IPTV-current state of the art and challenges." Computational Engineering in Systems Applications, IMACS Multiconference on. IEEE, 2006.*
International Search Report and Written Opinion for International Application No. PCT/IL2007/000346 dated Aug. 13, 2007, 12 pages.

* cited by examiner

SESSION HANDOVER BETWEEN TERMINALS

CROSS REFERENCE TO RELATED APPLICATIONS

This application claims the benefit of U.S. provisional patent application 60/783,191 filed on Mar. 17, 2006 by the present inventor.

BACKGROUND OF THE INVENTION

1. Field of the Invention

The present invention relates to transfer and/or duplication of communication sessions, for example communication sessions involving wireless personal portable user terminals.

2. Description of Related Art

People use portable devices to listen to broadcast programming (for example, radio or television programming), to make phone calls and to receive rights-protected programming such as on-demand programming (e.g. subscription content or pay-per view content). From time to time, a user starting a session with one device may want to continue the session with another device. For example, a user may listen to a broadcasted concert using a portable radio, and then may want to hear the end of the concert on his or her home stereo system. In another example, a user may start a phone call using his or her personal cellular phone and then may want to transfer the call to another person at his or her vicinity.

Presently, such session handover is made manually: in the first example, one will need to manually tune his home stereo to the same radio station set on his portable radio, while in the second example, one will hand over his personal telephone handset to the other person. Such manual procedures are inconvenient. In other cases, for example when communicating with an on-demand service, a communication session involves a security handshake, such as negotiation and exchange of session keys, in order to protect the privacy of the participants or the digital rights of a content provider that electronically packages the content for being used only on a specific device. Resuming such a session on another device, may be unfeasible because the transferee device may lack the require keys or identity which indicates rights to receive particular content provided by the service.

The term "session handover" or "session transfer" used throughout this document relates to the transfer of a communication session between user terminals. It must not be confused with a similar term used in the context of cellular telephony, relating to the transfer of a session between cellular base stations and a single user terminal.

Thus, there is an ongoing need, and it would be highly desirable to have, improved techniques for handover of sessions between a plurality of client devices.

BRIEF SUMMARY

The present inventor is now disclosing methods, apparatus, devices and systems where a remote communication session, that is maintained (i.e. on the client end) by a first user terminal, is transferred to or duplicated for a second user terminal. The teachings of various embodiments of the present invention are applicable for a number of communications systems including but not limited to telephony systems, systems where rights-protected digital content is remotely served (for example, as a media stream), and systems where content is broadcast (i.e. an analog or a digital content broadcast), and other systems.

It is now disclosed for the first time a method of handling transfer of a remote session, the method comprising: a) maintaining the remote session by a first user terminal; b) transmitting a short range communication indicative of the remote session from the first user terminal to a second user terminal different from the first user terminal; c) receiving the session-indicative communication by the second user terminal; and d) in response to the receiving of the session-indicative communication, establishing the remote session by the second user terminal.

According to some embodiments, the 'indicative communication' is a 'session-handover command' to transfer and/or duplicate the session. Nevertheless, an explicit command is not required.

It is appreciated that the 'maintaining of a remote session' is not required to be carried out exclusively on the client end (i.e. by the terminal device) or on the remote server end. Thus, the phrase 'maintaining of a remote session' may refer to maintaining the session in cooperation with one or more remote devices, for example, deployed in the telephone network or as part of a remote on-demand service or in any other wide-area system.

For the present disclosure, the term 'short range' communication may refer, to a short range communication that is a short range wired communication as well as to a short range wireless 'point-to-point' communication.

In contrast, the 'remote communication' is typically carried out, at least in part, over a switching network (e.g. circuit-switched or packet-switched).

The phrase 'establishing the remote session' may refer to the situation where the remote session is transferred from the first communication device to the second communication device which may 'continue' the session. Thus, in some embodiments, the session with the first terminal device is degraded or terminated (i.e. either by the first terminal device and/or by a remote server(s) or service-provider) after the indication of the session is sent and/or after the second terminal device establishes the remote session. Alternatively, the phrase 'establishing the remote session' may refer to the situation where the session is 'duplicated' between the first and second terminal devices. Thus, according to this example, the first user terminal may concomitantly continue the remote session even after the second user terminal 'establishes the session.'

As noted above, a 'contact' or 'wired' communication is one example of a short-range communication. Thus, according to some embodiments, the transmitting of the short range communication includes contacting a housing of the first user terminal with a housing of the second user terminal.

Discussion of Certain Use Cases

According to one exemplary use-case, a user, views a remotely-streamed movie on her cellular telephone while 'on the road.' Upon returning home, the user wishes to continue watching movie on her home-based large-screen television. According to this specific example, the user contacts the cellular telephone to her large-screen television (or brings the cellular telephone into a location that is proximate to the large-screen television), and sends a session handoff command indicative of one or more session parameters of the remote session that has been maintained (i.e. at the client end) by the cellular telephone. Upon receiving the session handoff command, the large-screen television may then send an indication of the one or more session parameters via a remote communications link, and establish the remote session.

According to another exemplary use-case, a cell phone user is engaging in a voice conversation with a destination calling party while 'on the road.' Upon returning home, the user wishes to continue the conversation using her landline. According to this specific example, the user contacts the cellular telephone to the 'landline' handset (or brings the cellular telephone into a location that is proximate to the 'landline' handset), and sends a session handoff command indicative of one or more session parameters of the telephone conversation that has been conducted using the cellular telephone.

Upon receiving the session landoff command, the landline handset may then send an indication of the one or more session parameters (i.e. for example a phone number of a 'destination calling party') to one or more servers deployed in the telephone network, and establish, in cooperation with the one or more servers, the remote session to continue the conversation with the 'destination calling party'.

Discussion of Various Features Provided by Some Embodiments

Thus, according to some embodiments, the short range communication is a short-range wireless communication.

According to some embodiments, the short-range wireless communication is selected from the group consisting of: i) a Bluetooth communication; ii) an infrared communication; iii) an ultrasound communication.

According to some embodiments, the session-indicative communication is indicative of at least one of: a) a tuning parameter; b) usage rights (for example, viewing rights) to a particular rights-protected remote service and/or remotely-server rights-protected digital content item(s) (i.e. usage rights that are provided, for example, in any manner known in the art of session-based on-demand remote services such as video on demand or games on-demand; for example, provided as a decryption key); c) a telephone session parameter; d) a media playback position parameter; and e) a media presentation parameter.

According to some embodiments, the sending of the indicative short range communication includes sending at least one session parameter from the user terminal device to the second user terminal device.

According to some embodiments, the method further comprises: upon the establishment of the remote session by the second user terminal, effecting (e.g. by the first user terminal or by a remote server(s) or service-provider) at least one session-modifying operation selected from the group consisting of: i) terminating the remote session (in one non-limiting example, by disconnecting the remote communications channel—this may be carried out at any location—for example, at the first user terminal and/or remotely at the 'server' side); and ii) degrading the remote session (this may be carried out at any location—for example, at the first user terminal and/or remotely at the 'server' side).

According to some embodiments, the short-range transmitting is carried out via a local channel that is different from a remote channel of the remote session maintained by the first user terminal.

Thus, in one non-limiting example, the first user terminal communicates via a wireless router which receives communications from the first user terminal and forwards these communications to the remote destination. According to this particular example, the short-range communication transmitted from the first to the second user terminal is not sent via the wireless route (i.e. which handles all remote communications for the first user terminal) but rather 'directly' via a point-to-point wireless connection or via a 'contact' or wired connection.

It is now disclosed for the first time a user terminal device comprising: a) a content receiver operative to maintain a remote session and to receive content: i) via a remote communication channel; and ii) in accordance with at least one remote session parameter of the remote session; b) a content presenter operative to present, to a user, the received content; and c) a session parameter transmitter operative to transmit, via a short-range communication channel that is different from the remote communication channel, an indication of at least one remote session parameter.

According to some embodiments, the content receiver is operative, subsequent to the transmitting of the session-parameter indication via the short-range communication channel, to effect at least one session-modifying operation selected from the croup consisting of: i) terminating the remote session; and ii) degrading the remote session.

It is now disclosed for the first time a method of operating a user terminal device, the method comprising: a) using the user terminal device to maintain a remote session at a client end of a remote communication channel; b) receiving content, by the user terminal device, via the remote communication channel, the receiving being carried out in accordance with at least one session parameter of the remote session; c) presenting, using the user terminal device, the received content; and d) transmitting, from the user terminal, an indication of at least one session parameter via a short-range communication channel that is different from the remote communication channel.

According to some embodiments, the method further comprises: e) subsequent to the transmitting of the session-parameter indication via the short-range communication channel, effecting at least one session-modifying operation selected from the group consisting of: i) terminating the remote session; and ii) degrading the remote session.

It is now disclosed for the first time a system for handling transfer of a remote session, the system comprising: a) a first user terminal; b) a second user terminal different from the first user terminal; wherein the first user terminal is operative i) to maintain the remote session and ii) to send a short range communication to the second user terminal indicative of the remote session, and wherein the second user terminal is operative to: i) receive the session-indicative communication; and ii) in response to the receiving of the session-indicative communication, establish the remote session.

According to some embodiments, the first user terminal is operative, subsequent to the short-range transmitting of the remote session indication, to effect at least one session-modifying operation selected from the group consisting of: i) terminating the remote session; and ii) degrading the remote session.

According to some embodiments, the system further comprises: c) a remote server array the remote server array being operative: i) to maintain the remote session with the first user terminal; ii) upon receipt, from the second user terminal, of a session-request associated with the remote session establishing by the second user terminal, to effect at least one session-modifying operation selected from the group consisting of: i) terminating the remote session; and ii) degrading the remote session.

For the present disclosure, a 'server array' defers to one or more servers. If the server array includes a plurality of servers, they may be deployed in any architecture, either locally or over a wide area.

It is now disclosed for the first time a method for providing a rights-enabled service, the method comprising: a) providing a remote service to a first user terminal in accordance with at least one session parameter including an indication of usage rights for the remote service; b) receiving a request to establish a remote session from a second user terminal different from the first user terminal, the remote session request including an indication of the at least one session parameter including the indication of the usage rights for the remote service; and c) in response to the received remote session request, providing the remote-service to the second user terminal device in accordance with at least one session parameter including the indication of the usage rights for the remote service.

According to some embodiments, the method further comprises: d) in response to the received remote session request, degrading or terminating the provided remote service for the first user terminal.

According to some embodiments, the provided remote service is an on-demand services.

It is now disclosed for the first time an apparatus for providing a rights-enabled content service, the apparatus comprising: a) a content server-array operative to provide a remote service to a first user terminal in accordance with at least one session parameter including an indication of usage rights for the remote service; b) a request-receiver operative to receive a request to establish a remote session from a second user terminal different from the first user terminal, the remote session request including an indication of the at least one session parameter including the indication of the usage rights for the remote service, wherein the content server-array is further operative, in response to the received session request, to provide the remote-service to the second user terminal device in accordance with at least one session parameter including the indication of the usage rights for the remote service.

According to some embodiments, the content server-array is further operative, in response to the received remote session-continuation request, to degrade or terminate the provided remote service for the first user terminal device.

According to some embodiments, the provided remote service is an on-demand service.

It is now disclosed for the first time a method for transferring a telephone session, the method comprising: a) maintaining the telephone session with a first user terminal in accordance with at least one session parameter; b) receiving, from a second user terminal different from the first user terminal, a request to transfer the telephone session, the request including at least one session parameter; and c) in response to the received session-transfer request, establishing the telephone session with the second user terminal in accordance with at least one session parameter of the session-transfer request.

It is now disclosed for the first time an apparatus for handling telephone session transfer, the apparatus comprising: a) a telephone session-provider to provide the telephone session to a first user terminal in accordance with at least one session parameter; b) a session-request handler operative: i) to receive, from a second user terminal different from the first user terminal, a request to transfer the telephone session; ii) to determine from the session-transfer request at least one session parameter; and wherein the telephone session-provider is further operative, in response to the received session-transfer request, to establish the telephone session with the second user terminal in accordance with at least one session parameter of the session-transfer request.

It is now disclosed for the first time a user terminal device comprising: a) a session parameter receiver operative to receive, via a short-range communication channel, an indication of at least one session parameter including an indication of usage rights for a remote service; and b) a content receiver operative: i) to establish, via a remote communication channel that is different from the short-range communication channel, a remote session in accordance with at least one received session parameter including the indication of usage rights for the remote service; ii) to receive content of the remote service in accordance with the established remote session.

It is now disclosed for the first time a method of session establishing, the method comprising: a) receiving via a short-range communication channel, an indication of at least one session parameter including an indication of usage rights for a remote service; b) establishing, via a remote communication channel that is different from the short-range communication channel, a remote session in accordance with at least one received session parameter including the indication of usage rights for the remote service.

According to some embodiments, the method further comprises: c) receiving content of the remote service in accordance with the established remote session.

These and further embodiments will be apparent from the detailed description and examples that follow.

While the invention is described herein by way of example for several embodiments and illustrative drawings, those skilled in the art will recognize that the invention is not limited to the embodiments or drawings described. It should be understood that the drawings and detailed description thereto are not intended to limit the invention to the particular form disclosed, but on the contrary, the invention is to cover all modifications, equivalents and alternatives falling within the spirit and scope of the present invention. As used throughout this application, the word "may" is used in a permissive sense (i.e., meaning "having the potential to"), rather than the mandatory sense (i.e. meaning "must").

DETAILED DESCRIPTION OF EMBODIMENTS

The present invention will now be described in terms of specific, example embodiments. It is to be understood that the invention is not limited to the example embodiments disclosed. It should also be understood that not every feature of the presently disclosed methods, devices, apparatus and systems for handing over a session is necessary to implement the invention as claimed in any particular one of the appended claims. Various elements and features of devices are described to fully enable the invention. It should also be understood that throughout this disclosure, where a process or method is shown or described, the steps of the method may be performed in any order or simultaneously, unless it is clear from the context that one step depends on another being performed first.

Figure 1:
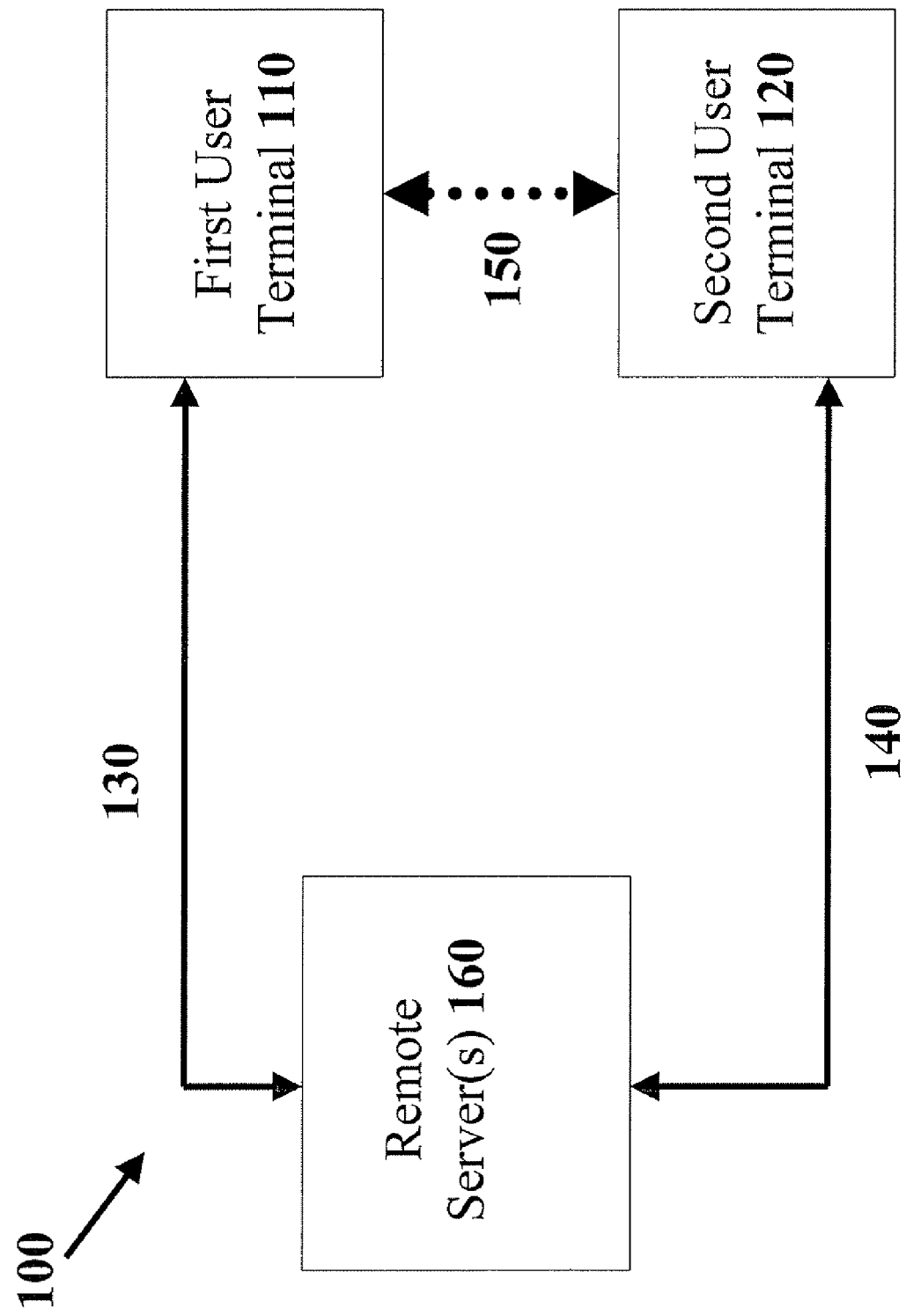
FIG. 1 is a schematic block diagram describing an exemplary system for session handover in accordance with some embodiments of the present invention.

Reference is made to FIG. 1 which provides a schematic block diagram describing an exemplary system for session handover in accordance with some embodiments of the present invention. A first user terminal 110, remotely communicates with a server array (i.e. one or more servers) 160 via remote communication link 130. When the user brings first user terminal 110 and another, second user terminal 120 in proximity (typically, up to 10 meters apart—or alternatively, in contact with each other), a short-range link 150, such as Bluetooth or infrared (IR) is used to communicate between the two user terminals, and the session particulars, as well as session keys and rights where appropriate, are transferred from first user terminal 110 via short-range link 150 to second user terminal 120. Second user terminal 120 then communicates with one or more remote server(s) 160 via link 140 to pull the session, and the user continues the session by using second user terminal 120.

Figure 2:
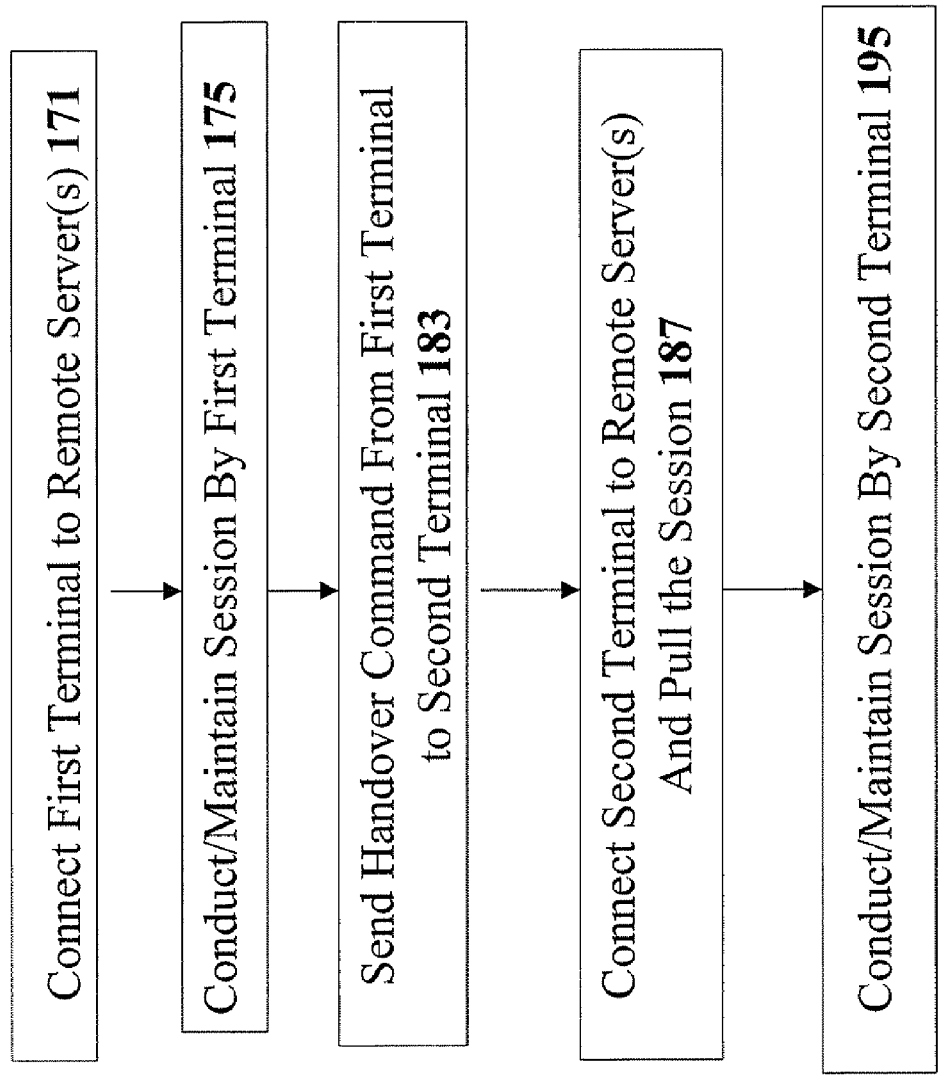
FIG. 2 is a schematic flowchart describing all exemplary technique for operating the system of FIG. 1.

FIG. 2 describes an exemplary technique for operating the system of FIG. 1. In step 171, first user terminal 110 connects to the remote server array 160 and in step 175, a session is conducted between first user terminal 110 and the remote server array 160. In step 183, first user terminal 110 and second user terminal 120 are put by the user of first user terminal 110 in proximity, and then short-range link 150 is established in order to send a handover command from first user terminal 110 to second user terminal 120. The handover command includes data that is needed by second user terminal 120 for pulling the session from one or more remote server(s) 160, such as the identification of the session, and rights (e.g. in the form of password or token) and keys that confirm to remote server or servers 160 that second user terminal 120 is eligible to pull the session. In step 187, second user terminal 120 connects via remote communications link 140 with the remote server(s) 160 and pulls the session. In step 195 the session is conducted between second user terminal 120 and one or more remote server(s) 160.

Figure 3A:
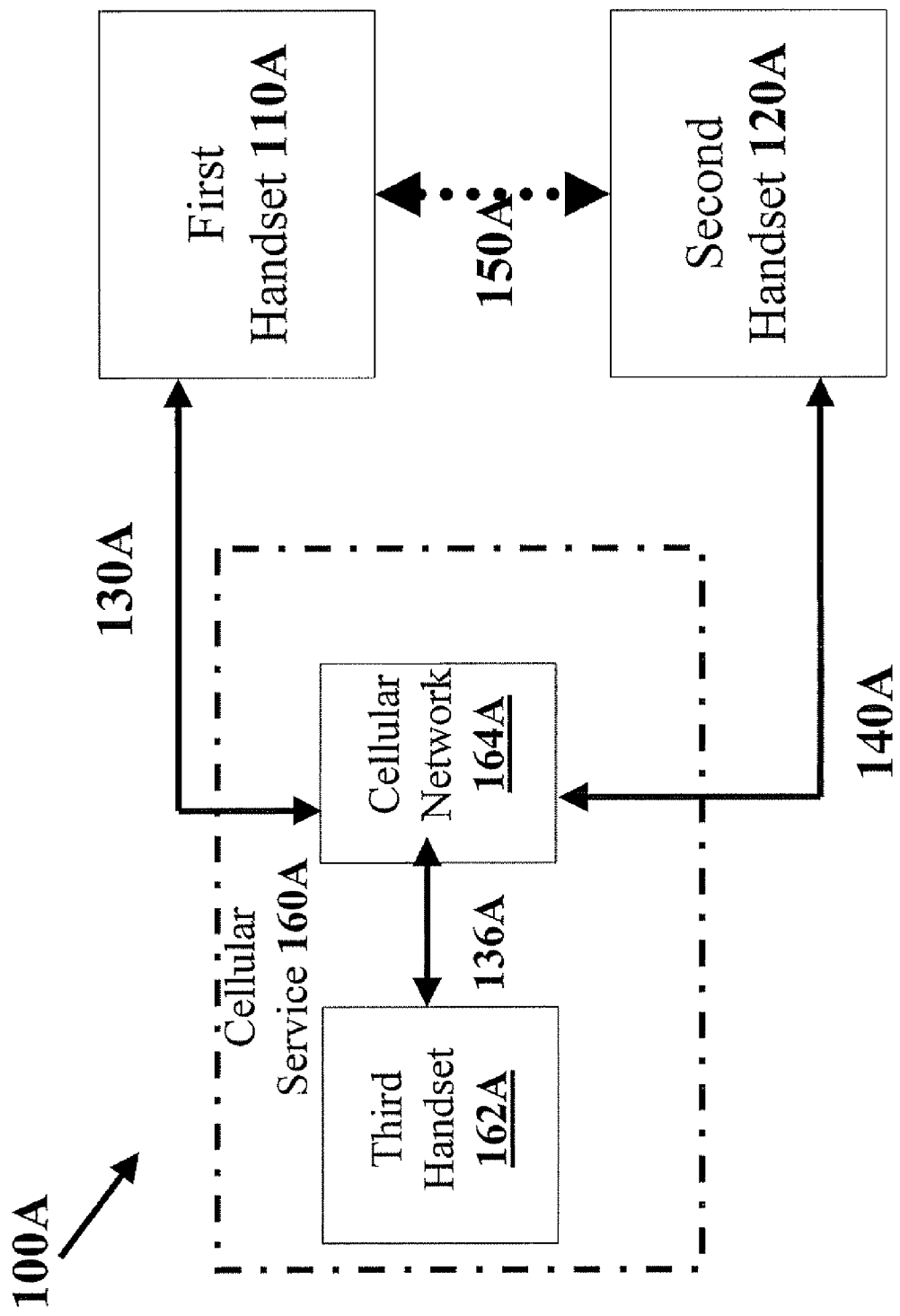
FIG. 3A is a schematic block diagram describing an exemplary system for session handover between telephone handsets.
Figure 4A:
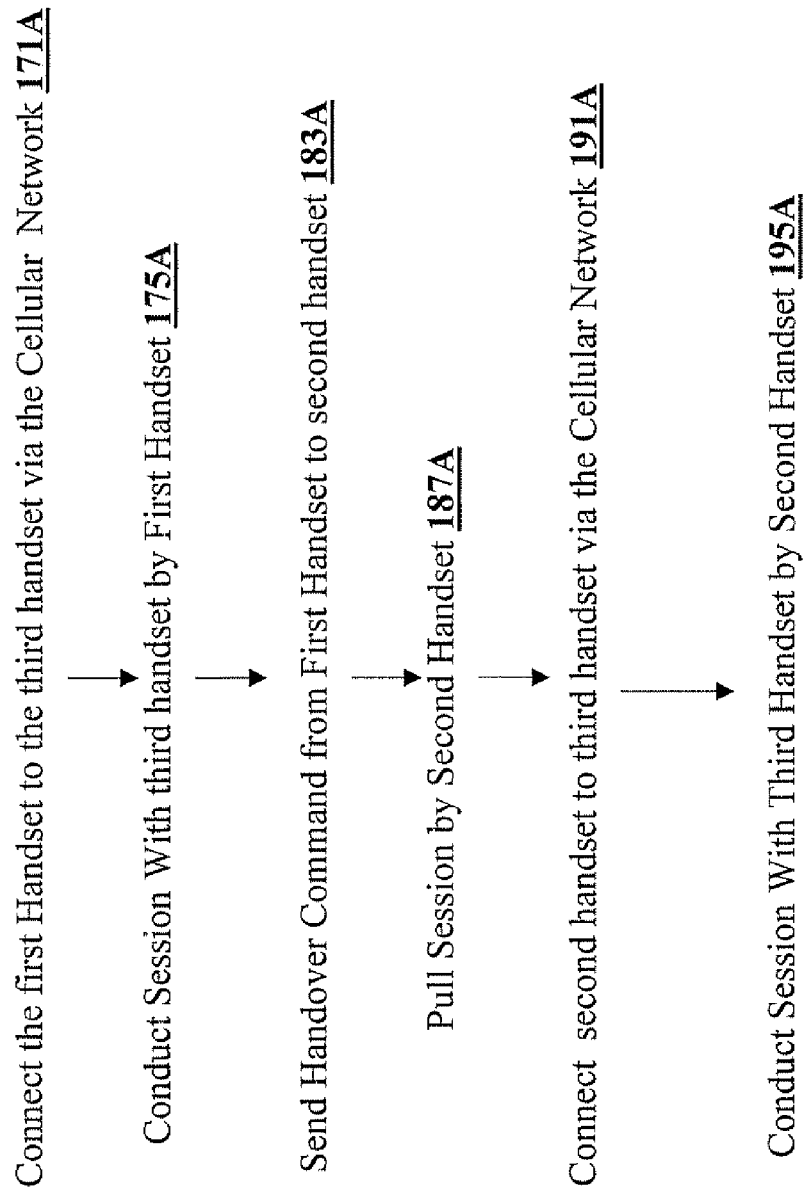
FIG. 4A is a schematic flowchart describing an exemplary technique for operating the system of FIG. 3A.

FIGS. 3A and 4A describe the structure and operation of a system 100A for the handing over of a phone call. Thus, in step 171A a first handset 110A connects conventionally with a third handset 162A via 'remote' link 130A, cellular network 164A and link 136A. Cellular network 164A, link 136A and third handset 162A are symbolically represented herein as cellular service 160A, which may be provided using one or more remote servers 160 as depicted in FIG. 1. In step 175A, first handset 110A and third handset 162A are used by the respective users to conduct a communication session, for example by a voice communication session, video communication session or text communication session.

In step 183A, first handset 110A and second handset 120A are placed in proximity of each other (i.e. close or in contact) by their respective users. When in proximity, the first handset 110A and second handset 120A use short-range link 150A (i.e. Which is different from remote links 130A and 140A), such as Bluetooth or infrared, to send session parameters, such as the identity of third handset 162A and permission by first handset 110A, from first handset 110A to second handset 120A. In step 187A, second handset 120A communicates with cellular network 164A and presents the session parameters described above. Cellular network 164A responds, in step 191a, by connecting second handset 120A with third handset 162A, which enables second handset 120A and third handset 162A to continue the session in a step 195A. In one example, at least one of link 130A and link 140A is a wireless link, while the other link, as well as link 136A, can be either wireless or, a landline.

Therefore, the teachings of the embodiment of FIGS. 3A and 4A can be used to transfer a call that is conducted between a first phone that is a mobile phone and a third handset that can be either mobile or landline phone, to a second phone that is either a mobile or landline phone. Similarly, the teachings of the embodiment of FIGS. 3 and 4 can be used to transfer a call that is conducted between a first phone that is a landline phone and a third handset that can be either mobile or landline phone, to a second phone that is a mobile phone.

Figure 3B:
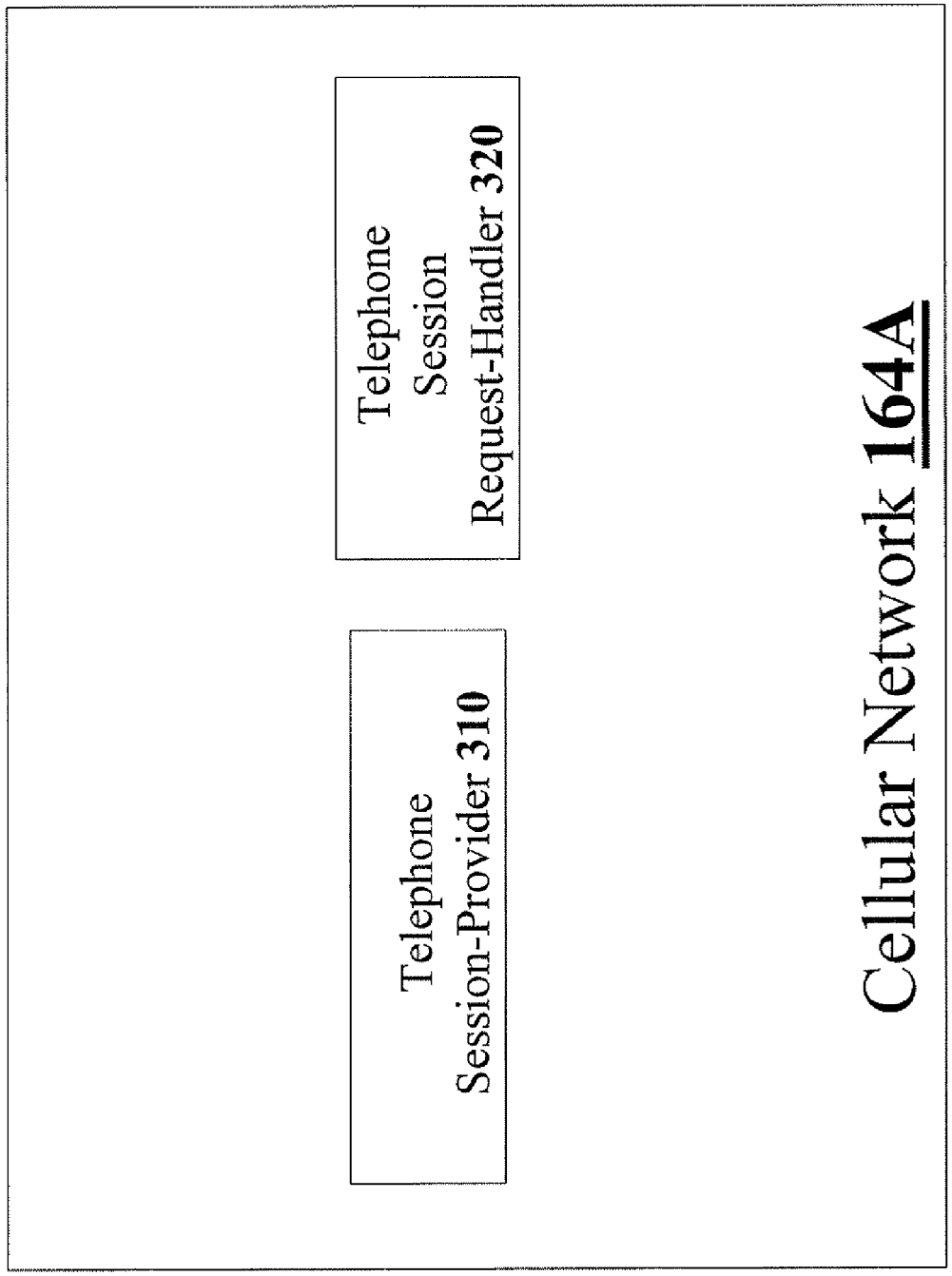
FIG. 3B is a schematic block diagram describing a telephone session-provider and a telephone session request-handler deployed in a telephone network in accordance with some embodiments.

FIG. 3B describes an exemplary telephone session provider 310 and telephone session request handler 320 as deployed in a telephone network (for example a cellular network). The telephone session provider 310 may provide session parameters to the first and/or second handsets, and may also be used to establish a session. The telephone session request-handler 320 is operative to remotely receive a request from the second handset 120A to 'pull' or transfer the session from the first handset 110A to the second handset 120A.

Figure 4B:
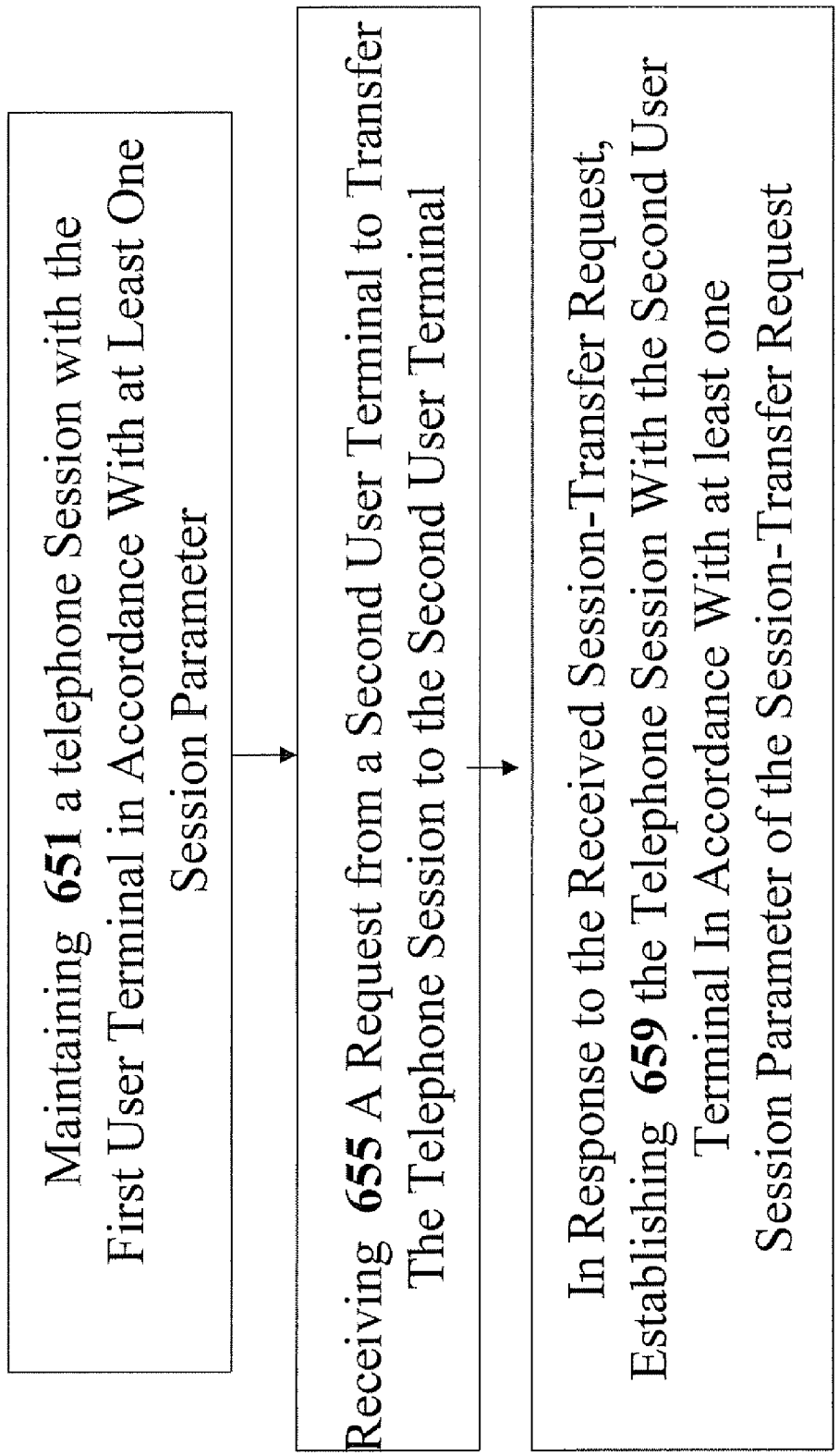
FIG. 4B is a schematic flowchart describing an exemplary technique for operating the elements depicted in FIG. 3B.

FIG. 4B describes an exemplary technique for handling transfer of the telephone session. In step 651, a telephone session is maintained (i.e. at least in part from the 'server' end—this may be accomplished, for example, by cellular network 164A, at least a portion of which is 'remote' relative to the first handset 110A) with the first user terminal in accordance with at least one session parameter. In step 655, a request is received (for example, by telephone session request-handler 320) from the second user terminal to transfer the telephone session to the second user terminal. In step 659, in response to the received request, a telephone session is established (for example, by telephone session-provider 310) with the second handset or user terminal 120A (for example, by 'connecting' the second handset 120A with the third handset 162A to enable a telephone conversation).

Figure 5:
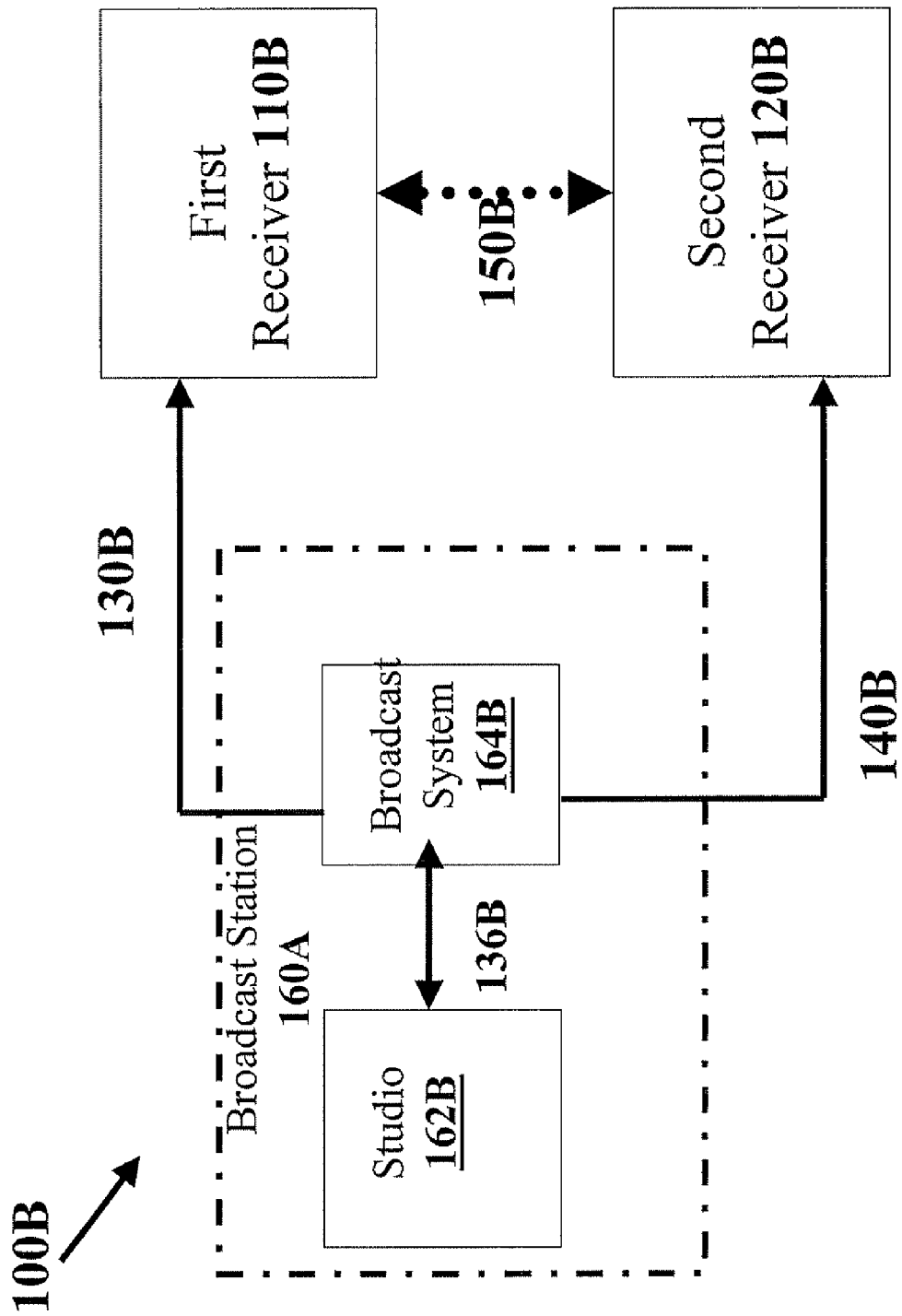
FIG. 5 is a schematic block diagram describing an exemplary session handover between broadcast receivers.
Figure 6:
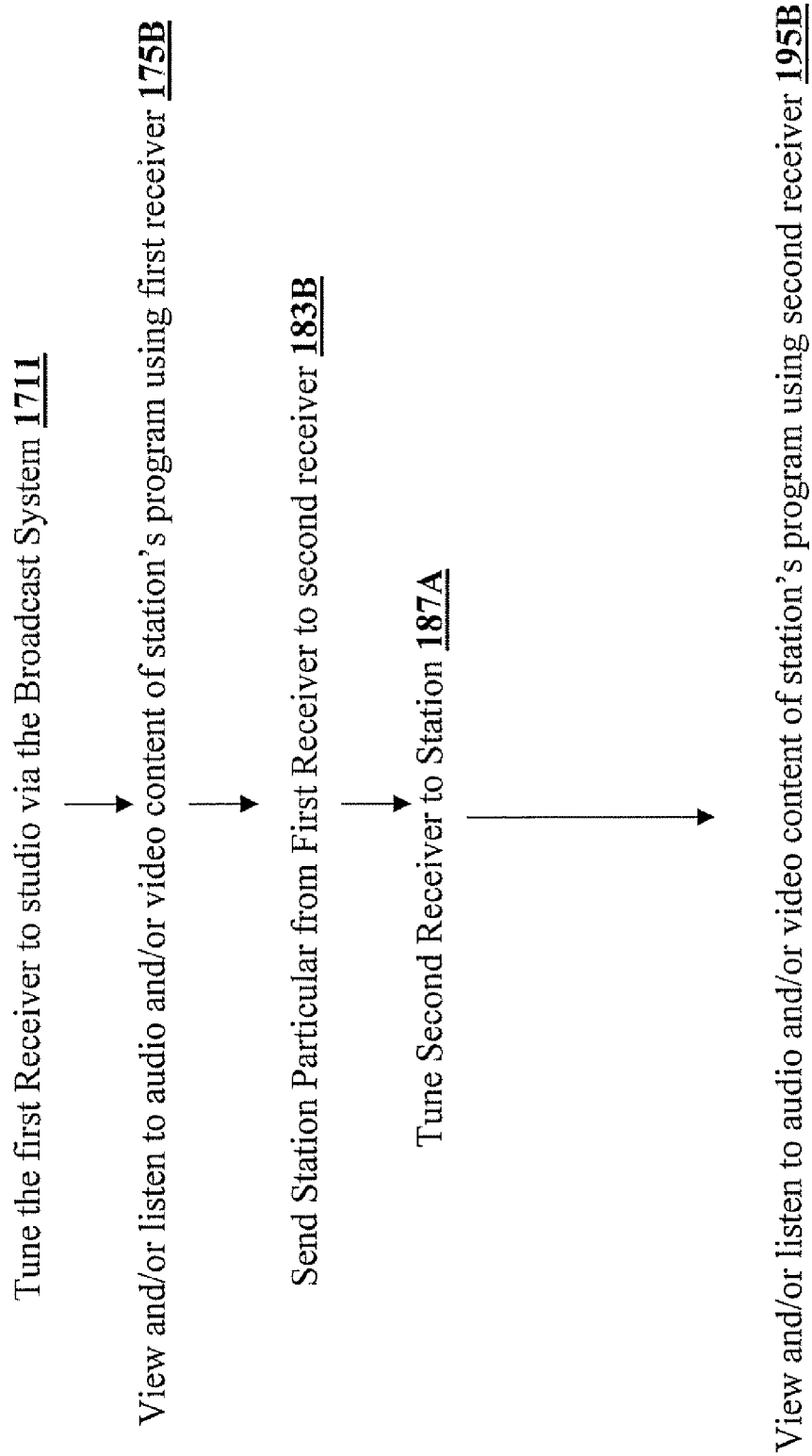
FIG. 6 is a schematic flowchart describing an exemplary technique for operating the system of FIG. 5.

FIGS. 5 and 6 describe the structure and operation of a system 100 B according to an embodiment that relates to transfer of a broadcast reception session. In one example, a user first uses a portable first receiver 110 B to listen to a live radio broadcast or view a TV program (or for any other broadcast streaming media, for example, via the Internet). This user may want to listen to or view the same program on second receiver 120 B that is, for example, his or her home entertainment center. Thus, in a step 171 B, portable first receiver 110 B is tuned by the user to a favorite program that is provided by a broadcast station 160 B from its studio 162 B through its broadcast system 164 B, which allows the user to listen to or view the program in a step 175 B. In step 183 B, when the user arrives home, the user places first receiver 110 B in the vicinity of second receiver 120 B, for example his home entertainment center, and short-range link 15 B, such as Bluetooth or IR, is used to send the particulars of the program of broadcast station 160 B from first receiver 110 B to second receiver 120 B. In step 187 B second receiver 120 B uses the received particulars to tune to the program of broadcast station 160 B (e.g. an analog or digital or Internet broadcast). Upon tuning to by the second receiver 120 B, the user may listen to or view the 'presented' program on second receiver 120 B in step 195 B. It will be noted that in the above scenario, 'remote' link 130 B may be an electromagnetic link used for radio or TV broadcast, while link 140 B can be either the same as link 130 B, or a cable service that provides the same program as link 130 B. Link 136 B may use wired or wireless technologies that are used commonly for connecting radio/TV studios to broadcast systems.

Figure 7:
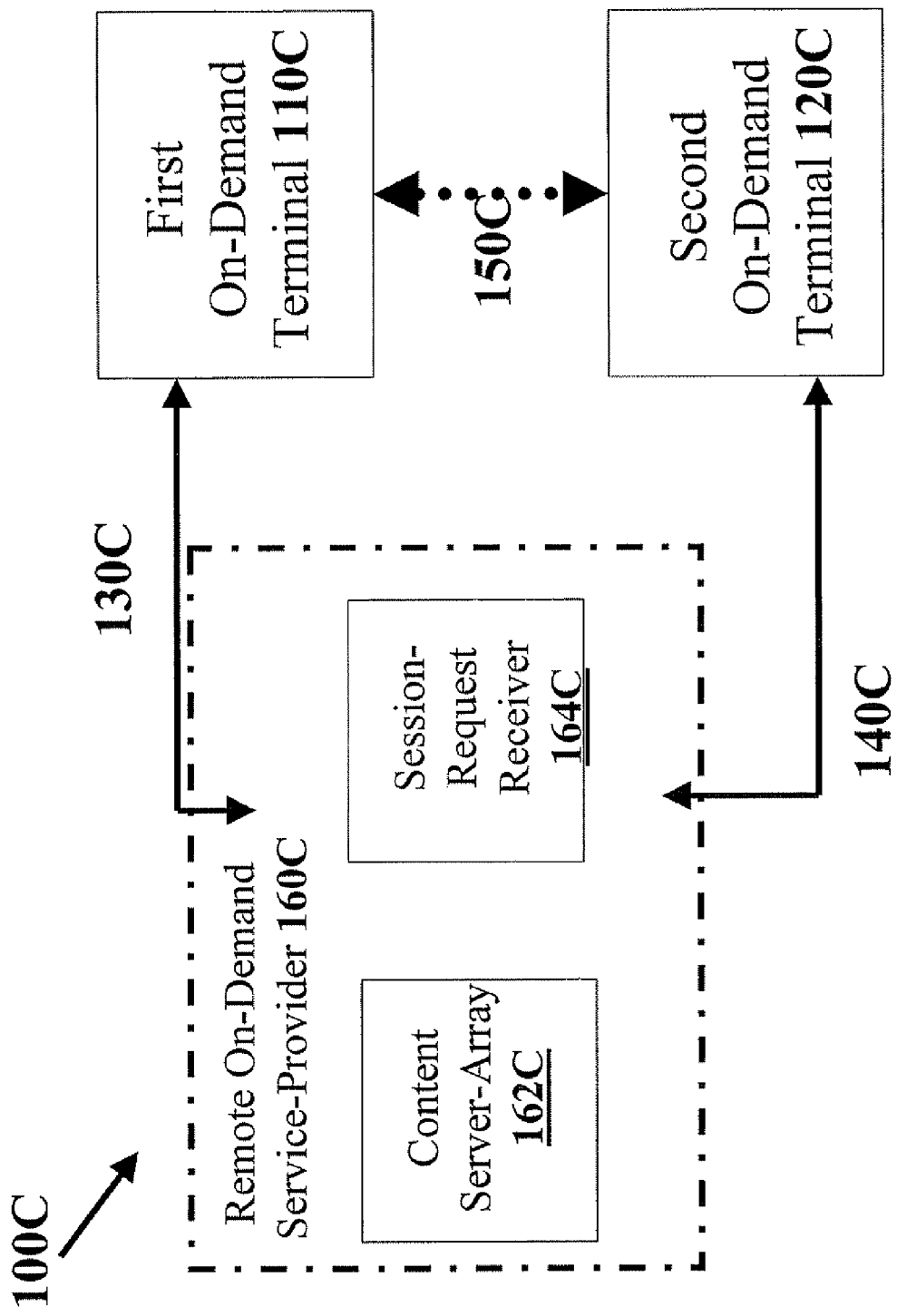
FIG. 7 is a schematic block diagram describing an exemplary system for session handover between on-demand terminals.
Figure 8:
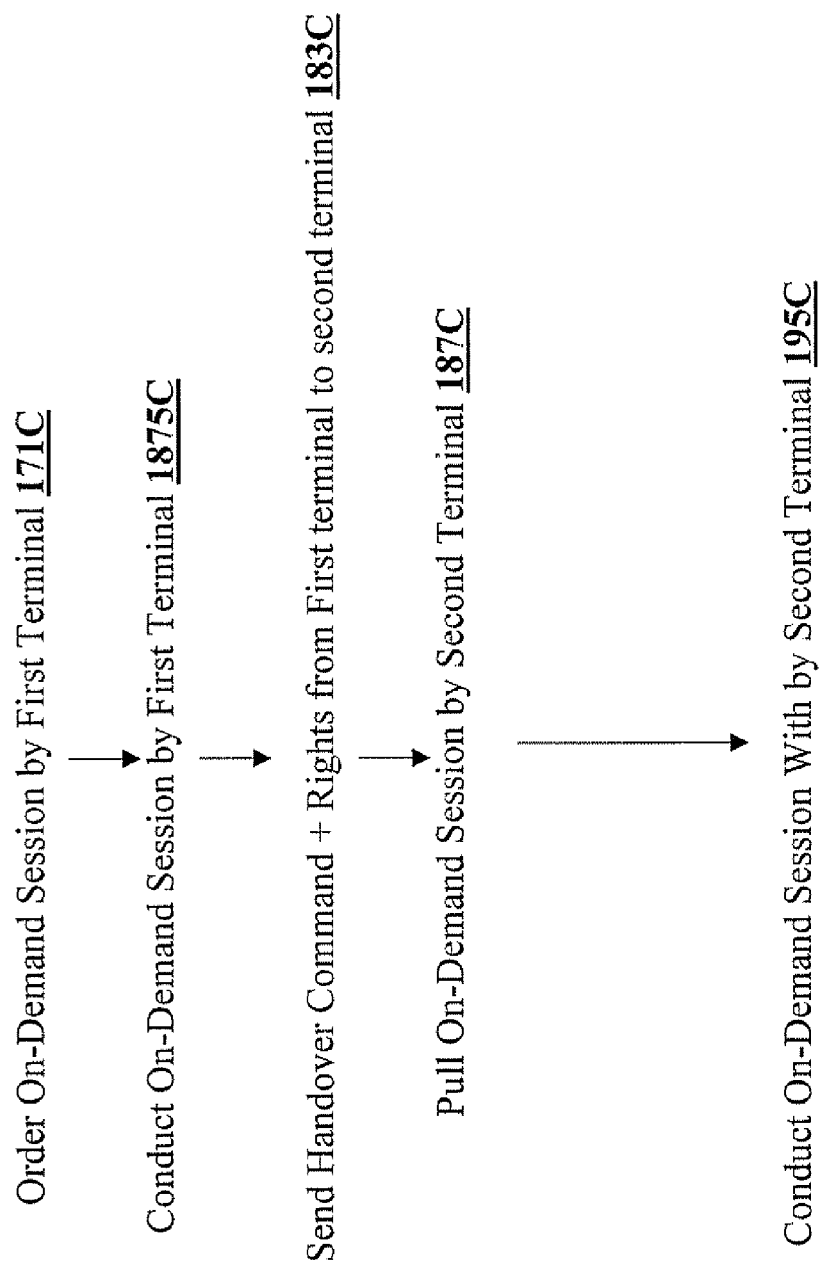
FIG. 8 is a schematic flowchart describing an exemplary technique for operating the system of FIG. 7.

FIGS. 7 and 8 describe the structure and operation of a system 100C for transferring a session in accordance with an embodiment that related to a paid on-demand audio or video service or an interactive game. This rights-protected on-demand content or remote service may be, for example, a subscription service or a 'pay-per-use' or 'pay-per-view' service. This embodiment is similar to the embodiment of FIGS. 5 and 6, with the addition of transferring usage rights (for example, for usage rights for a particular terminal device) from the first to second terminal. Thus, in step 171C, first on-demand terminal 110C (e.g. a mobile user terminal for receiving a paid audio, video or interactive game program from on-demand service 160C) communicates with on-demand controller (not shown) to order a preferred program from content library (not shown) under a commercial pay-per-view or subscription arrangement, which allows conducting the ordered session by first on-demand terminal 110C in step 175C. On-demand controller includes common means known in the art for receiving orders, billing and distributing content from content library (not shown) via link 130C and link 140C.

According to one example, a user first views on-demand content using the first on-demand terminal 110C. According to this example, when the user arrives home, the user places first on-demand terminal 110C in the vicinity of second on-demand terminal 120C, for example his home entertainment center, and short-range link 150C, such as Bluetooth or IR, is used (i.e. in step 183) to send the particulars of the programs, the current program position, and the viewing rights and session keys, all respective to the program previously selected in step 171C, from first on-demand terminal 110C to second on-demand terminal 120C. In step 187C, second on-demand terminal 120C connects with on-demand controller 164C and presents, to the on-demand controller, data that was first received from on-demand terminal 110C in step 183C. In the current example, the on demand controller (not shown) responds, in step 195C, by discontinuing the session on first on-demand terminal 110C and resuming the session on second on-demand terminal 120C. It will be noted that in the above scenario, remote link 130C may be a two-way electromagnetic link, such as a cellular telephony link, while remote link 140C can be either a similar two-way electromagnetic link, or a cable service that provides the same on-demand service as link 130C.

It is noted that the content server-array 162C and the session request receiver 164C may be implemented on the same machine or machines or may be on different machines, either located locally relative to each other or distributed in a wide-area network. Content server-array 162C and session request receiver 164C may communicate with each other using any known wired or wireless communications link (i.e., either communication within a single machine or between machines). In some embodiments, portions or the entirety of content server-array 162C and/or session request receiver, 164C may be implemented as part of the on-demand controller, (not shown).

It is noted that FIG. 7 depicts a content server-array 162C which is operative to serve on-demand content (or to provide an on-demand service), for example, using content stored in the aforementioned content library (not shown). The content server-array 162C provides (for example, in steps 175C or 195C) the on-demand service in accordance with one or more parameters of the session—for example, including at least one parameter indicative of usage rights held by a terminal device on the client end. Furthermore, the system in FIG. 7 includes a session-request receiver 164C for receiving from the second on-demand terminal 120C the request to continue the session on the second terminal.

Figure 9:
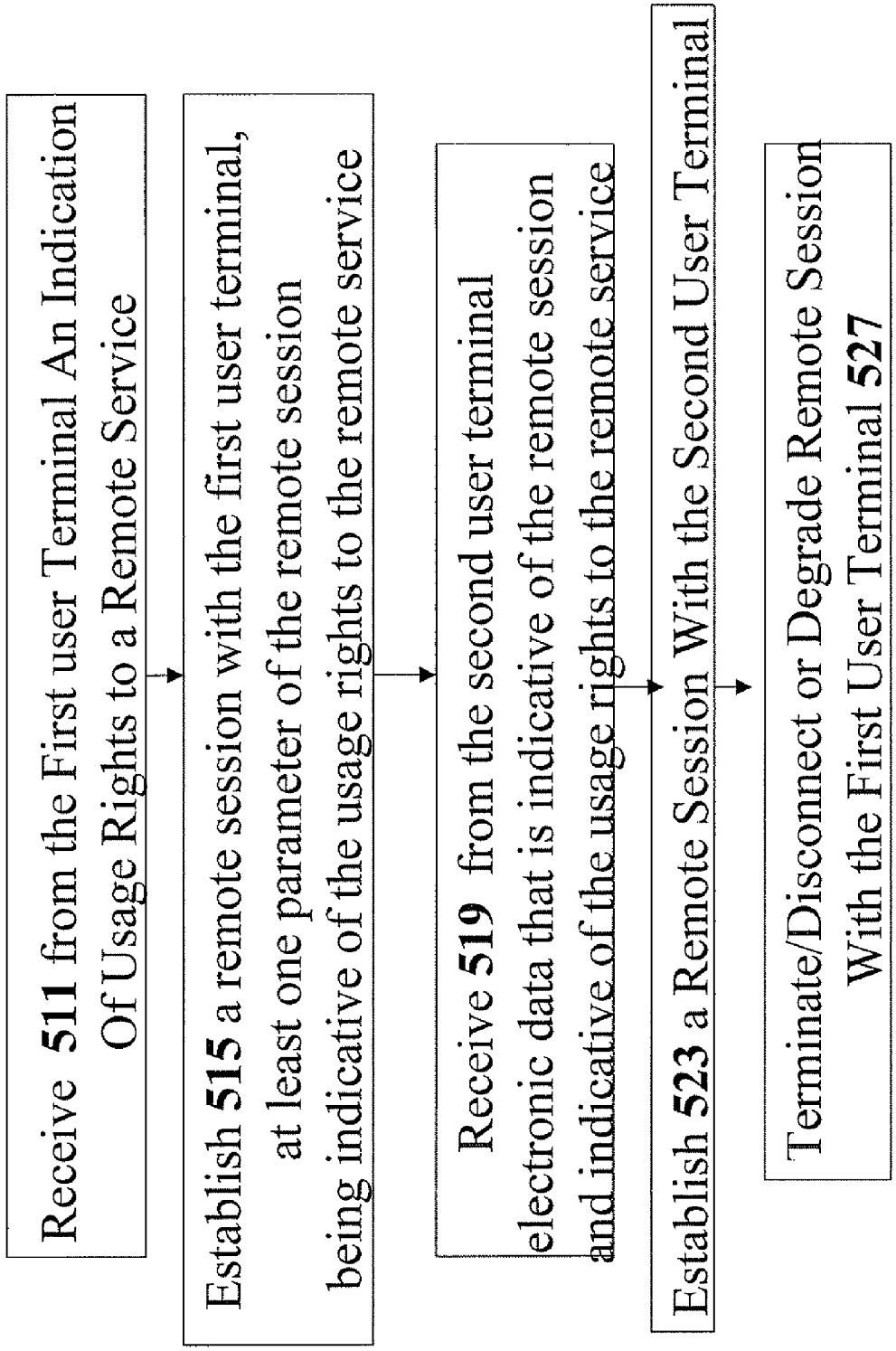
FIG. 9 is a schematic flowchart describing an exemplary technique for handling a transfer, of an on-demand remote service from a first terminal to a second terminal.

FIG. 9 provides a flow chart of an exemplary technique for providing a rights-restricted or rights-protected remote service in accordance with some embodiments of the present invention. In some embodiments, the technique of FIG. 9 is carried out in the system defined in the example of FIG. 7. In step 511, the remote on-demand service-provider 160 C remotely receives an indication of usage rights to the remote service. This indication may include, for example, a token or a key—for example, a key for decrypting encrypted on-demand content. In step 515, the remote on-demand service-provider 160 C establishes (for example, from the 'server' end) a remote session with the first on-demand terminal 110 C. At least one session parameter of the remote session is indicative of the usage rights to the remote service held by the first on-demand terminal. In step 519, an indication of the remote session and the usage rights is received (for example, by session request receiver 164 C) over a remote communications link from the second user terminal. In some embodiments, this is in the context of a 'session transfer request.' In step 523, a remote session is established between the on-demand service provide 160 C (for example, content server-array 162 C on the server side) and second user terminal. This remote session is established in accordance with the received indication of the usage rights received in step 519. This allows the second user terminal to continue the session previously maintained (i.e. on the client end) by the first user terminal. Optionally, in step 527, the session with the first terminal is terminated and/or disconnected upon establishment of the session with the second user terminal.

Figure 10:
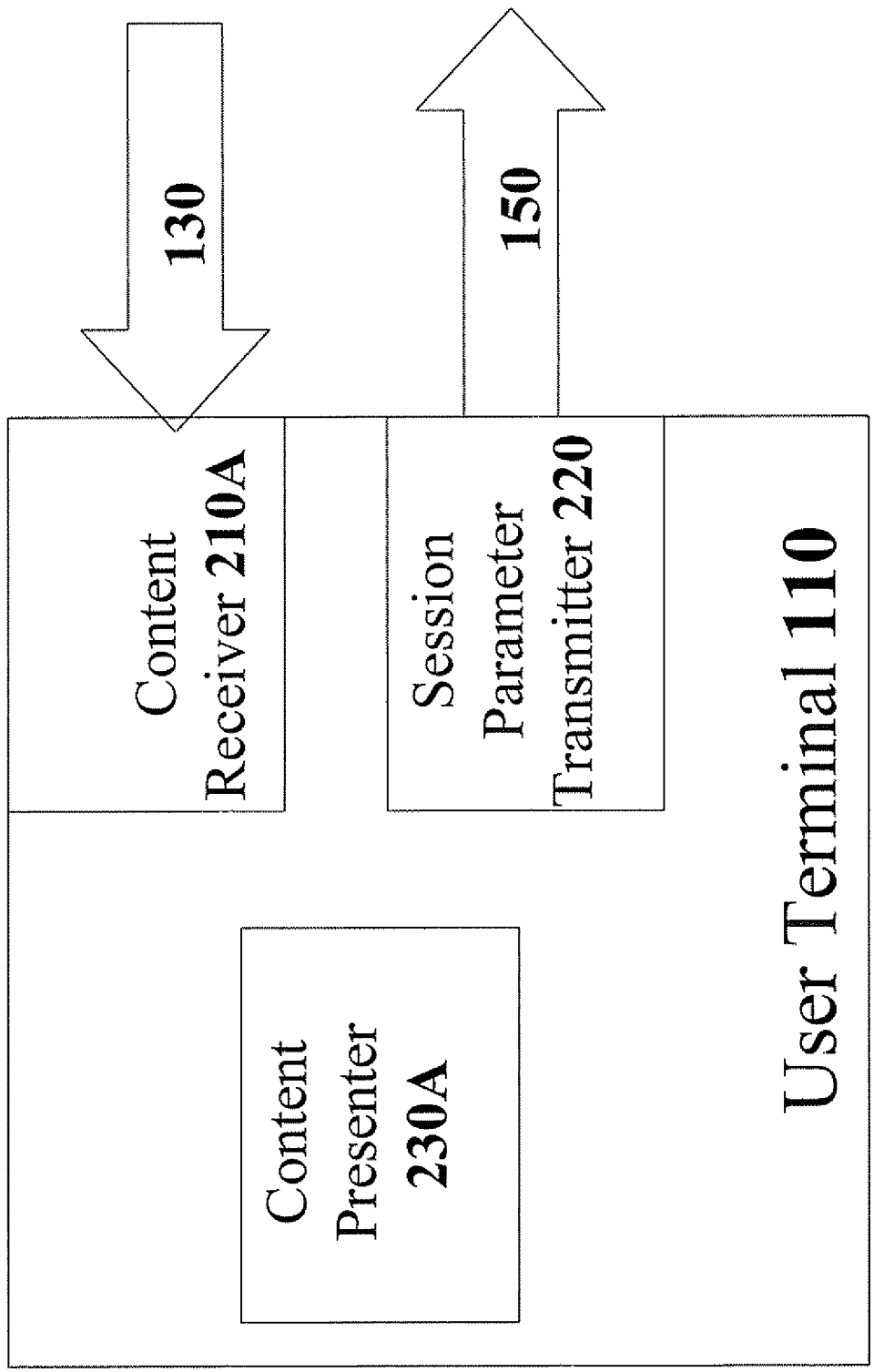
FIG. 10 is a schematic block diagram describing an exemplary first user terminal.

FIG. 10 describes an exemplary user terminal device 110 that is operative to: (i) receive content (i.e. using content receiver 210A) over a remote communications channel 130; (ii) present (i.e. using a display screen and/or speaker of content presenter 230A) the received content and (iii) transmit one or more session parameters of the remote session over a local communications channel 150 that is different from the remote communications channel 130.

Figure 11:
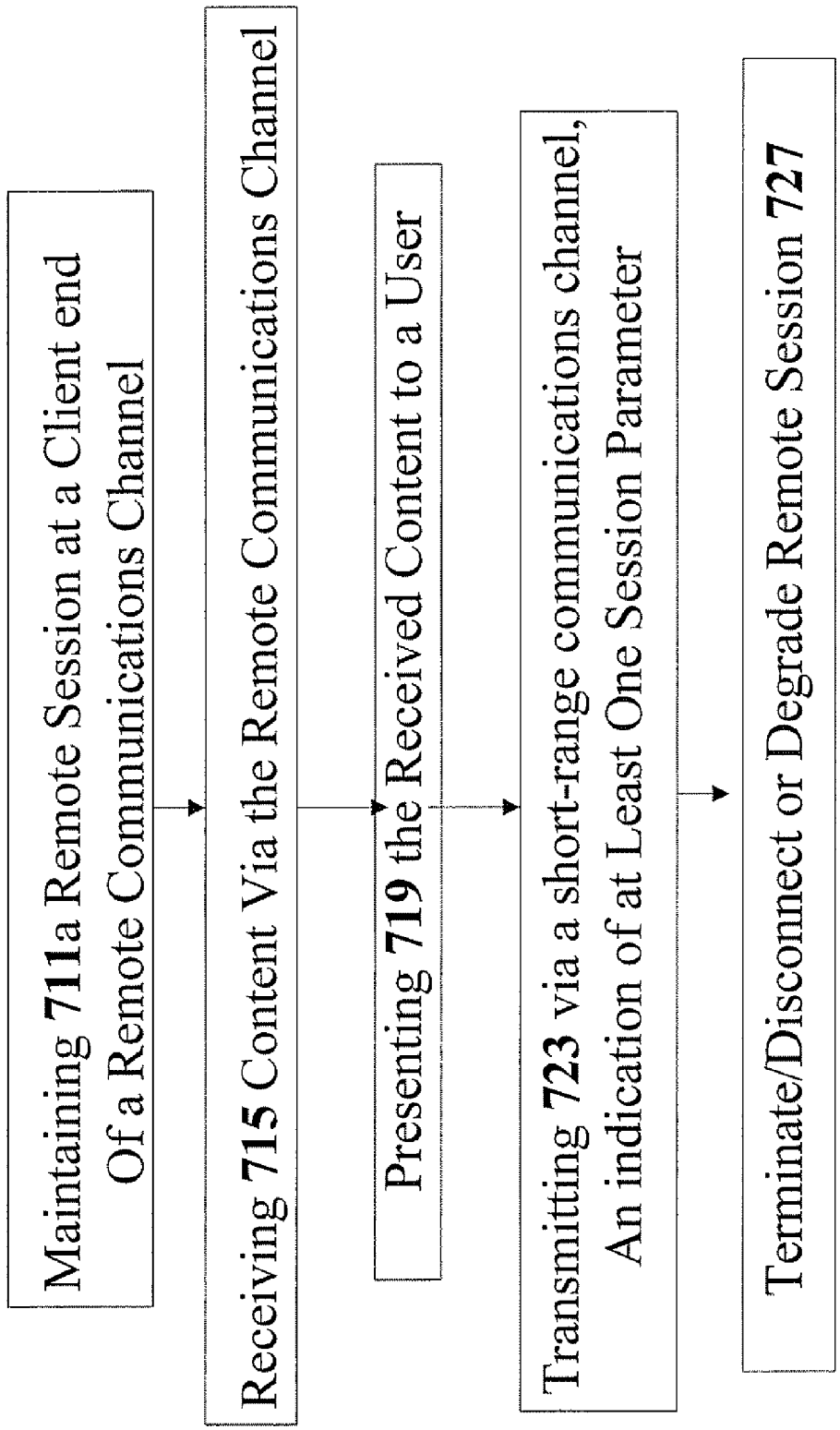
FIG. 11 is a schematic block diagram describing an exemplary technique for operating the exemplary first user terminal depicted in FIG. 10.

FIG. 11 describes an exemplary technique for operating the device of FIG. 10. Thus, in step 711 a remote session is maintained (i.e. at the client end of the remote communications channel 130). This may include, for example, maintaining one end of the phone conversation with a remote telephone, or keeping a device tuned to received streaming content, or having the device receive a particular on-demand service associated with usage rights. Thus, in step 715 content is received via the remote communications channel in accordance with one or more parameters of the remote session. In step 719, the received content is presented to a user—for example, visually and/or by generating sound-waves indicative of electronic audio content. In step 723, the session may be duplicated and/or transferred to the second user terminal 720. Towards this end, an indication of at least one session parameter of the previously-maintained remote session is transmitted via the short-range communications link 150. Optionally, in step 727, upon transmitting the indication of the session (i.e. in step 723) the device may terminate and/or disconnect and/or degrade the remote session 727. Although for the example of FIG. 11 the remote session is terminated by the first client device, this is not a limitation, and alternatively, the termination may be carried out, for example, at the remote server end.

Figure 12:
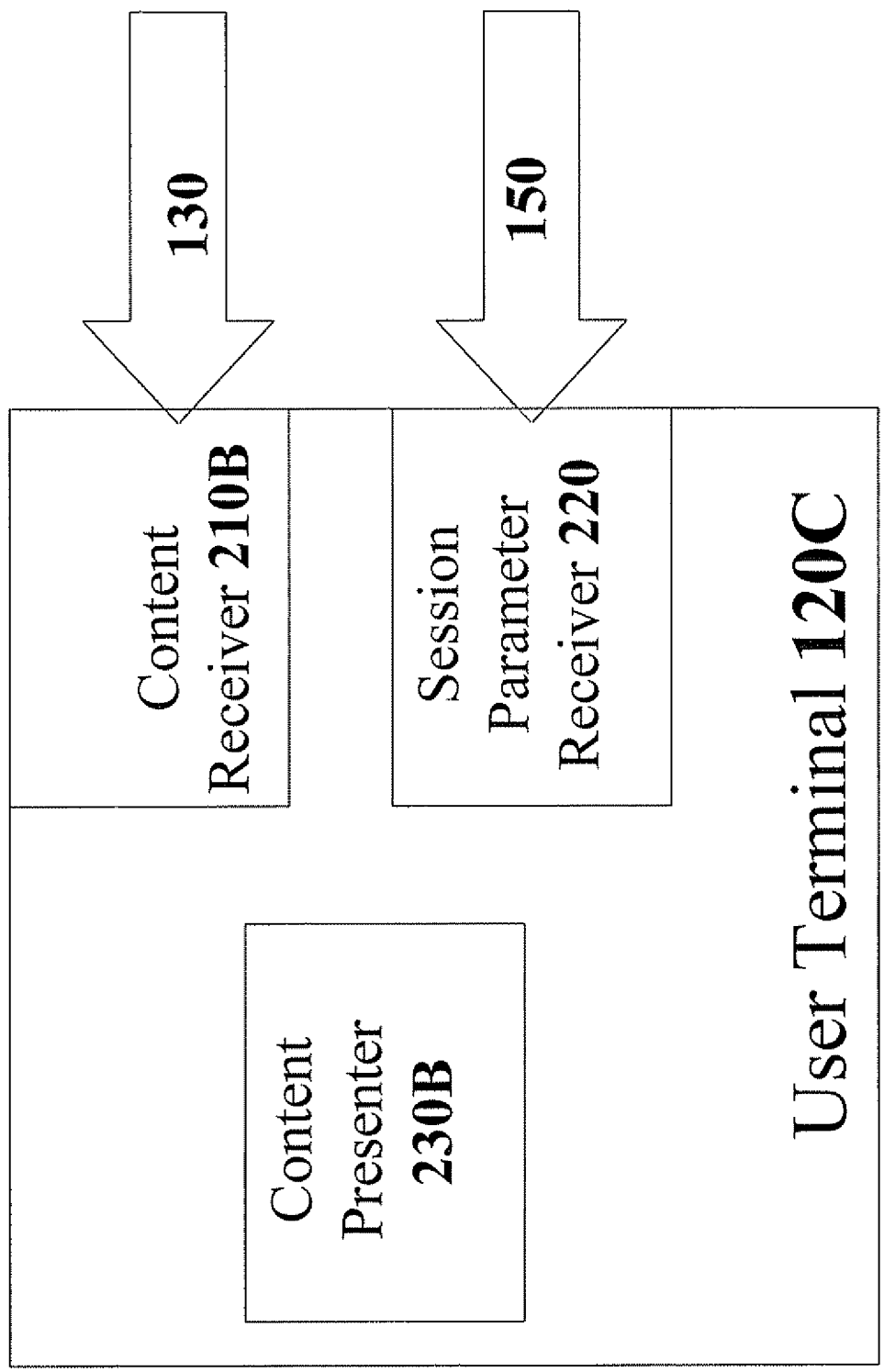
FIG. 12 is a schematic block diagram describing an exemplary second user terminal.
Figure 13A:
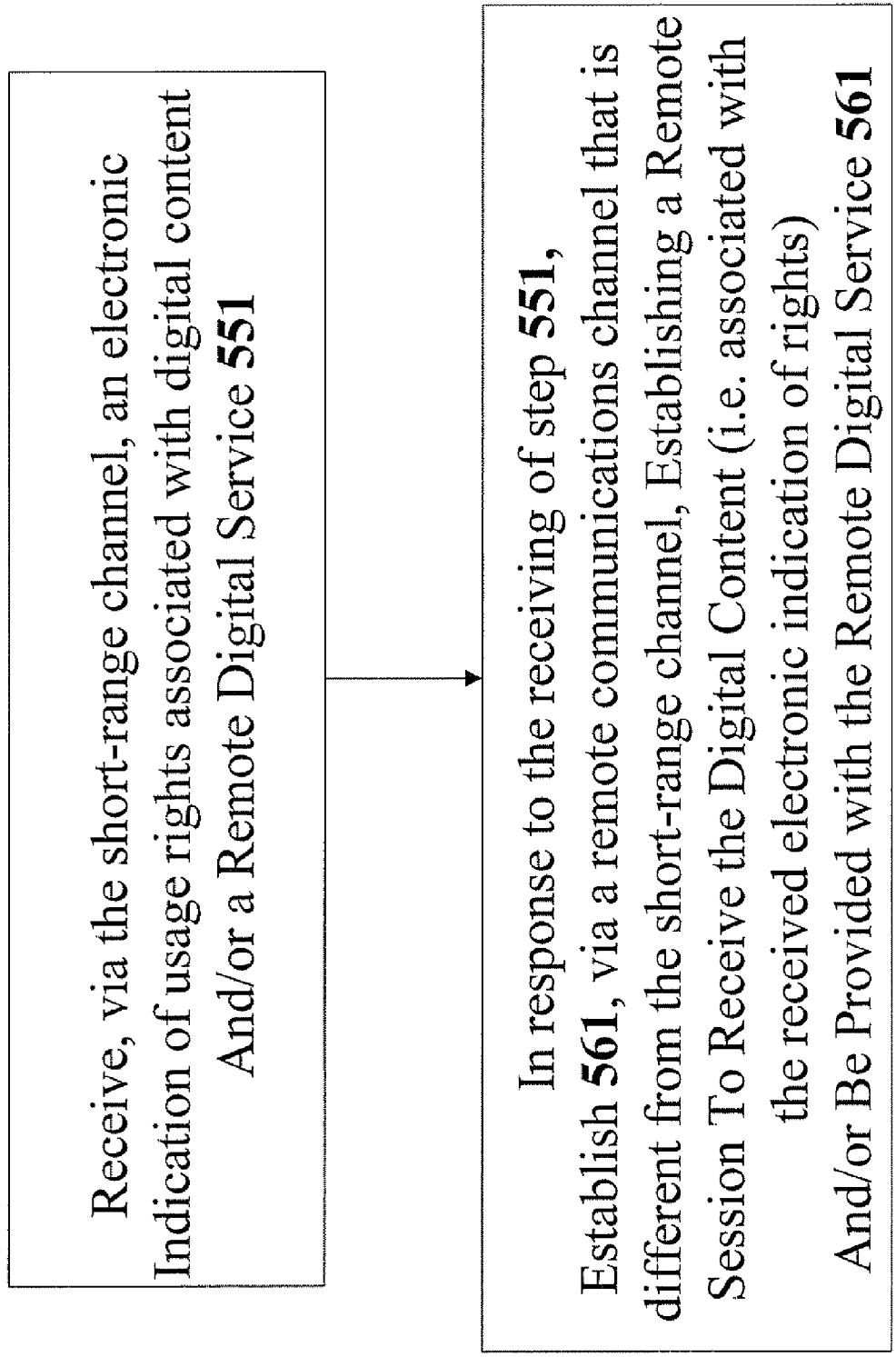
FIG. 13A-13B provide schematic block diagrams describing exemplary techniques for operating the exemplary second user terminal depicted in FIG. 12.
Figure 13B:
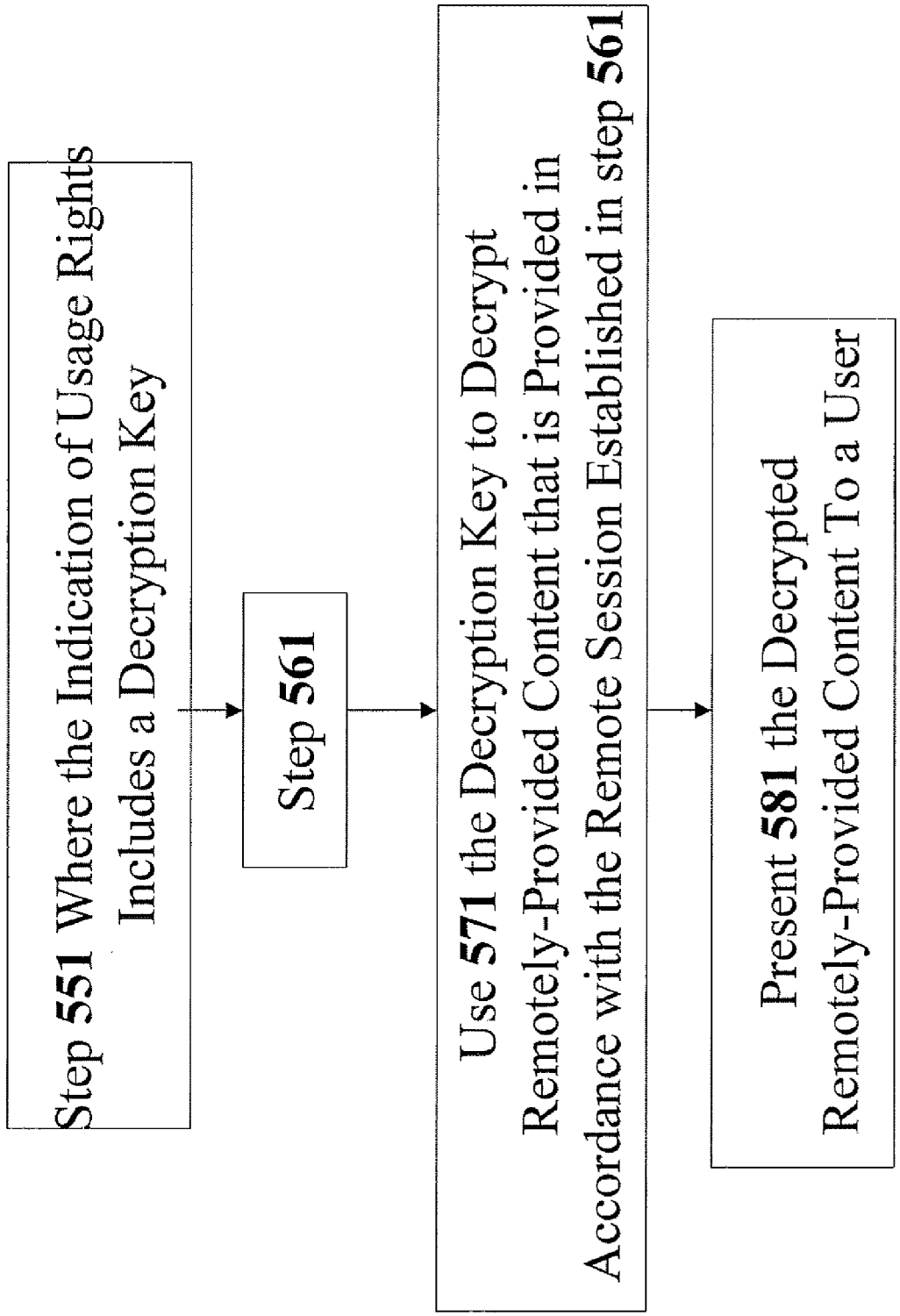

FIG. 12 provides a block diagram of an exemplary 'second' on-demand terminal 120C, and FIGS. 13A-13B provide flowcharts of exemplary techniques for operating on-demand terminal 120C. In step 551, an indication of usage rights is received (for example from the first on-demand terminal 110C) by session parameter receiver 220. In step 561, in response to the received indication of usage rights, a remote session is established using the usage rights (i.e. for which an indication was received in step 551) with the remote on-demand service-provider 160C, thereby configuring the 'second' user terminal 120C to receive the remote service (for example, a game service or a service where content is sent and/or streamed) in accordance with the usage rights.

In one example, associated with FIG. 13B, the electronic indication of usage rights is a decryption key for decrypting encrypted content sent via the remote communications channel 130. Thus, according to this example, one session parameter is the decryption key—i.e. content server array 162C is operative, in the context of the remote 'on-demand service' session, to encrypt the protected content using the decryption key and the user terminal 120C is to operative decrypt the encrypted content, as indicated in step 561. In step 581, the decrypted remotely-provided content (i.e. on-demand content) is presented using content presenter 230B.

It will be noted that while various embodiments have been described with the first terminal being wireless and the second being either wireless or wired, also the opposite can be implemented in some preferred embodiments; for example, a user may start to view or listen to a program on his or her home entertainment center, and continues using a mobile unit.

In different examples above, when the session is transferred and/or duplicated, the second terminal device is allowed to continue and/or duplicate the remote session using one or more so-called session parameters of the remote session maintained and/or conducted using the first user terminal device. Exemplary session parameters include but are not limited to: a) tuning parameters (for example, a electromagnetic frequency or URL for the case of Internet-provided or Internet-streamed content); b) telephone session parameters (for example, a parameter indicative of the remote 'third handset 162A' or remote calling party/parties with which the telephone conversation is being conducted such as a phone number); c) an indication of usage rights (for example, viewing rights) to a particular remote service and/or remote digital content item(s) (i.e. usage rights that are provided, for example, in any manner known in the art of session-based on-demand remote services such as video on demand or games on-demand; for example, provided as a decryption key); d) media presentation parameters (i.e. parameter indicative of how the media should be presented by the user terminal device—for example, a loudness or brightness or contrast or view parameter); and e) media playback position parameters. The term 'media playback position parameter' refers to a 'time position' within an audio and/or video program—i.e. the distance in time from the current content and the beginning of the program and/or end of the program and/or any other time-fixed location in the program. One example of a 'media playback position parameter' is '24 minutes 3 seconds elapsed since the beginning of the program' or '12 minutes 51 seconds until the end of the program.'

While the invention has been described with respect to a limited member of embodiments, it will be appreciated by persons skilled in the art that the present invention is not limited by what has been particularly shown and described herein. Rather the scope of the present invention includes both combinations and sub-combinations of the various features described herein, as well as variations and modifications which would occur to persons skilled in the art upon reading the specification and which are not in the prior art.

In the description and claims of the present application, each of the verbs, "comprise" "include" and "have", and conjugates thereof are used to indicate that the object or objects of the verb are not necessarily a complete listing of members, components, elements or parts of the subject or subjects of the verb.

All references cited herein are incorporated by reference in their entirety. Citation of a reference does not constitute an admission that the reference is prior art.

The articles "a" and "an" are used herein to refer to one or to more than one (i.e., to at least one) of the grammatical object of the article. By way of example, "tan element" means one element or more than one element.

The term "including" is used herein to mean, and is used interchangeably with, the phrase "including but not limited" to.

The term "or" is used herein to mean, and is used interchangeably with, the term "and/or" unless context clearly indicates otherwise.

The term "such as" is used herein to mean, and is used interchangeably, with the phrase "such as but not limited to".

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art.

What is claimed is:

1. A method of handling transfer of a remote session, the method comprising:
    receiving, at a first terminal device, streaming media content of a content server via a first communication path, the streaming media content corresponding to a first instance of a remote session conducted between the first terminal device and the content server;
    transmitting, from the first terminal device to a second terminal device that is different from the first terminal device via a second communication path that is distinct from the first communication path, a communication providing an indication of usage rights corresponding to the remote session, the indication of usage rights enabling the second terminal device to conduct a second instance of the remote session with the content server;

maintaining the first instance of the remote session at the first terminal device during and after establishment of the second instance of the remote session, wherein the second instance of the remote session enables the second terminal device to receive the streaming media content concurrently with the first terminal device receiving the streaming media content; and degrading, by the first terminal device after the second terminal device begins to receive the streaming media content, a service quality of the streaming media content received at the first terminal device.

2. The method of claim 1, wherein the second communication path is a wired communication path, and wherein the communication includes a session handoff command.

3. The method of claim 1, wherein the indication includes a session identifier of the remote session, and wherein the second terminal device begins to receive the streaming media content in response to receiving the communication and based on the indication of usage rights associated with the streaming media content.

4. The method of claim 1, wherein the second communication path is a wireless communication path.

5. The method of claim 4, wherein the communication includes an ultrasound communication.

6. The method of claim 1, wherein the communication includes a media playback position parameter.

7. The method of claim 1, wherein the streaming media content is encrypted, and wherein the communication includes a decryption key for decrypting the streaming media content.

8. The method of claim 1, wherein the streaming media content comprises a movie, and wherein the second terminal device comprises a television receiving device.

9. The method of claim 1, wherein, after the first terminal device transmits the communication, the second instance of the remote session is established without a request from the first terminal device to the content server.

10. The method of claim 1, wherein the communication is transmitted using a short range communication based on a first housing of the first terminal device being in contact with a second housing of the second terminal device, wherein the short range communication is a short range point-to-point wireless communication from the first terminal device directly to the second terminal device, and wherein the communication is transmitted while the first terminal device is receiving the streaming media content.

11. The method of claim 1, wherein the first terminal device maintains the first instance of the remote session that is associated with the first terminal device receiving the streaming media content, wherein the second terminal device maintains the second instance of the remote session that is associated with the second terminal device receiving the streaming media content, and wherein the second instance of the remote session is a duplicate remote session of the first instance of the remote session.

12. The method of claim 1, wherein the second terminal device maintains the second instance of the remote session and continues to receive the streaming media content after the first terminal device terminates the first instance of the remote session and stops receiving the streaming media content.

13. The method of claim 1, further comprising, after the second instance of the remote session is established and when the first terminal device and the second terminal device concurrently receive the streaming media content:

receiving, at the first terminal device, the streaming media content having a first service quality; and generating the streaming media content having a second service quality, wherein the second service quality is a lower quality than the first service quality.

14. The method of claim 1, further comprising, prior to sending the communication to the second terminal device:

identifying the second terminal device; and verifying that the second terminal device is compatible with the remote session, wherein the communication is transmitted responsive a determination that the second terminal device is compatible with the remote session.

15. The method of claim 1, further comprising terminating, by the first terminal device, the first instance of the remote session after degrading the service quality of the streaming media content.

16. The method of claim 1, further comprising prior to sending the communication to the second terminal device, presenting, at the first terminal device, the streaming media content having a first service quality; and after the second instance of the remote session is established, presenting, at the first terminal device, the streaming media content having a second service quality, wherein the second service quality is a lower quality than the first service quality.

17. The method of claim 1, wherein degrading the service quality of the streaming media content comprises:

receiving, at the first terminal from the content server and after the second terminal device begins to receive the streaming media content, the streaming media content having a first service quality; and modifying the received streaming media content to have a second service quality, wherein the second service quality is a lower quality than the first service quality.

18. An apparatus comprising:

a content receiver device operative to receive streaming media content via a remote communication channel, the streaming media content corresponding to a first instance of a remote session;

a session parameter transmitter device operative to transmit, via a short range communication channel that is different from the remote communication channel, an indication of usage rights corresponding to the remote session to a terminal device to enable the terminal device to conduct a second instance of the remote session to receive the streaming media content, wherein the content receiver device is operative, subsequent to transmitting the indication via the short range communication channel, to maintain the first instance of the remote session during and subsequent to the second instance of the remote session being established at the terminal device, and wherein the content receiver device is operative to receive the streaming media content during the first instance of the remote session concurrently with the terminal device receiving the streaming media content during the second instance of the remote session; and a content presenter device operative to degrade a service quality of the received streaming media content received at the content receiver device, wherein the received streaming media content is degraded in response to the second instance of the remote session being established.

19. A method comprising:

receiving streaming media content at a first terminal device via a first communication channel, the streaming media content corresponding to a first instance of a remote session conducted at the first terminal device;

transmitting, from the first terminal device to a second terminal device, a session key associated with the streaming media content, wherein the session key is transmitted via a second communication channel that is different from the first communication channel, and wherein the session key enables the second terminal device to establish a second instance of the remote session to receive the streaming media content;

subsequent to transmitting the session key, maintaining the first instance of the remote session during and after establishment of the second instance of the remote session at the second terminal device, wherein the first terminal device and the second terminal device concurrently receive the streaming media content during a portion of the second instance of the remote session; and degrading, by the first terminal device after the second terminal device begins to receive the streaming media content, a service quality of the streaming media content received at the first terminal device.

20. A method comprising:

providing, from a remote server, a first instance of a remote service to a first terminal device via a first communication path, wherein the remote service includes streaming media content;

receiving, at the remote server, a request to provide the remote service to a second terminal device that is distinct from the first terminal device, the request received from the second terminal device via a path that excludes the first terminal device, the request including a session key corresponds to the remote service, wherein the session key has been received by the second terminal device from the first terminal device via a second communication path that is distinct from the first communication path;

in response to the received request, providing a second instance of the remote service from the remote server to the second terminal device, wherein the streaming media content is provided to the first terminal device while the streaming media content is also provided to the second terminal device; and in response to the second instance of the remote service being provided to the second terminal device, degrading, at the remote server, a service quality of the streaming media content provided to the first terminal device.

21. The method of claim 20, wherein the request indicates that the second terminal device is granted viewing rights to the streaming media content of the remote service.

22. A method comprising:

maintaining, by a network server, a first instance of a telephone session with a first terminal device via a first communication path in accordance with a session parameter, wherein the session parameter includes a session key, and wherein the telephone session includes a voice call associated with a destination calling party;

receiving, at the network server, a request from a second terminal device via a path that excludes the first terminal device, the request to transfer the telephone session from the first terminal device to the second terminal device, the request including the session parameter that has been provided to the second terminal device via a second communication path that is distinct from the first communication path;

in response to receiving the request, providing, by the network server, providing a second instance of the telephone session to the second terminal device in accordance with the session parameter and continuing the first instance of the telephone session with the first terminal device, wherein the first terminal device and the second terminal device concurrently receive the voice call; and in response to the second instance of the telephone session being provided to the second terminal device, degrading a service quality of the voice call provided to the first terminal device.

23. The method of claim 22, wherein the first terminal device comprises a cellular telephone and the second terminal device comprises a landline telephone.

24. An apparatus comprising:

a telephone session-provider device to provide a first instance of a telephone session via a first communication channel to a first terminal device in accordance with a session parameter, wherein the session parameter includes a session key, and wherein the telephone session includes a voice call associated with a destination calling party; and a session-request handler device that is distinct from the first terminal device and that is operative to:

receive from a second terminal device via a path that excludes the first terminal device, a request to transfer the telephone session, wherein the request includes the session parameter, and wherein prior to receiving the request the session parameter has been provided to the second terminal device via a second communication path that is distinct from the first communication channel;

in response to receiving the request, provide a second instance of the telephone session to the second terminal device in accordance with the session parameter and to continue the first instance of the telephone session with the first terminal device, wherein the first terminal device and the second terminal device concurrently receive the voice call; and in response to the second instance of the telephone session being provided to the second terminal device, degrade a service quality of the voice call provided to the first terminal device.

25. An apparatus comprising:

a session parameter receiver device operative to receive, via a short range communication channel, a session key associated with streaming media content of a server; and a content receiver device operative to receive, via a remote communication channel that is different from the short range communication channel, the streaming media content corresponding to a remote session, the remote session established by another device between the other device and the server, wherein the streaming media content is received at the content receiver device conditioned upon receipt by the session parameter receiver device of the session key, wherein prior to receiving the streaming media content, communication is established with the server by sending a request to the server via a communication path that excludes the other device, wherein the other device continues to receive the streaming media content during a first instance of the remote session after the content receiver device begins to receive the streaming media content during a second instance of the remote session, and wherein, prior to the content receiver device receiving the streaming media content, a first service quality of the streaming media content is provided to the other device and, after the content receiver device receives the streaming media content, a second service quality of the streaming media content is provided to the other device, the second service quality being a lower quality than the first service quality.

26. A method comprising:
receiving, from a first receiver at a second receiver via a short range communication channel, a session key corresponding to a remote session, wherein the remote session is associated with streaming media content that is accessible by the first receiver during a first instance of a remote session between the first receiver and a server; and receiving the streaming media content via a remote communication channel at the second receiver in response to receipt by the second receiver of the session key from the first receiver and conditioned on sending a request from the second receiver to the server via a communication path that excludes the first receiver, wherein the remote communication channel is different from the short range communication channel, wherein the streaming media content is received from the server during a second instance of the remote session between the second receiver and the server, wherein the streaming media content is received by the first receiver concurrently with the second receiver after the second receiver begins to receive the streaming media content, and wherein, prior to the second receiver receiving the streaming media content, a first service quality of the streaming media content is provided to the first receiver and, after the second receiver receives the streaming media content, a second service quality of the streaming media content is provided to the first receiver, the second service quality being a lower quality than the first service quality.

27. An apparatus comprising:
a session parameter receiver device operative to receive, from a terminal device via a short range communication channel, a session parameter including a session key corresponding to a remote session associated with streaming media content from a server to the terminal device during a first instance of the remote session established between the terminal device and the server; and a content receiver device operative to receive the streaming media content via a remote communication channel that is different from the short range communication channel, wherein, in response to receipt by the session parameter receiver device of the session parameter from the terminal device, the streaming media content is received at the content receiver device from the server during a second instance of the remote session, wherein the second instance of the remote session is established with the server in response to a request sent from the content receiver device to the server, the request sent via a path that excludes the terminal device, wherein the streaming media content is accessible to the terminal device concurrently with the content receiver device after the content receiver device begins receiving the streaming media content, and wherein, prior to the content receiver device receiving the streaming media content, a first service quality of the streaming media content is provided to the terminal device and, after the content receiver device receives the streaming media content, a second service quality of the streaming media content is provided to the terminal device, the second service quality being a lower quality than the first service quality.

* * * * *